J. Shalkenback,
Sad Iron,

No. 79,262. Patented June 23, 1868.

Witnesses.
G. L. Chapin
A. Hayward.

Inventor.
Joseph Shalkenback.

United States Patent Office.

JOSEPH SHALKENBACK, OF CHICAGO, ILLINOIS.

Letters Patent No. 79,262, dated June 23, 1868.

IMPROVED SAD-IRON.

*The Schedule referred to in these Letters Patent and making part of the same.*

TO ALL WHOM IT MAY CONCERN:

Be it known that I, JOSEPH SHALKENBACK, of Chicago, in the county of Cook, in the State of Illinois, have invented a new and useful Improvement in Sad-Irons; and I do hereby declare that the following is a full and exact description thereof, reference being had to the accompanying drawings, and to the letters of reference marked thereon, making a part of this specification, in which—

Figure 1:
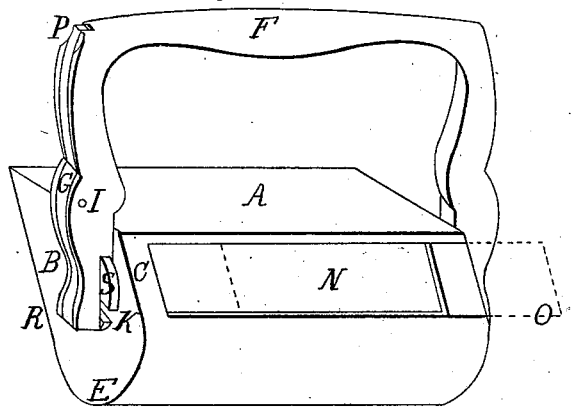

Figure 1 is a perspective representation of my invention.

Figure 2:
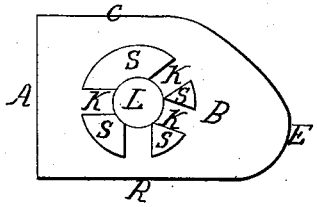

Figure 2, an end view of the same, with the handle removed.

Figure 3:
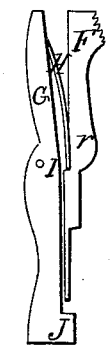

Figure 3, a view of the opposite end, with the handle in position for use.

Figure 4:
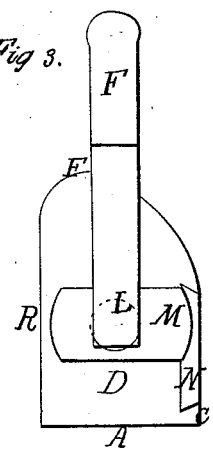

Figure 4, a section of the handle, spring, and catch.

The nature of my invention consists in the use of an iron, arranged with curved and flat surfaces, to suit the shape of the article to be ironed, and to revolve between the ends of the handle, secured by pivots, and a spring-catch fitting in notches at the end of the iron, so that the latter may be readily brought into position for use, and a sliding lid for closing the heating-chamber, and a button, hung to one of said pivots, by means of which the lid may be readily opened and closed, when the heater is to be removed.

To enable others to make and use my invention, I have marked corresponding parts with similar letters, and will now give a detailed description.

A represents an iron, which has three flat sides, R C A, and a curved side, E, all of which are made smooth and used for ironing, except the side C. This has a lid, N, dove-tailed in, as seen at fig. 3, and arranged to slide in said slide, and close a common heating-chamber inside of the iron, A, a button, M, being used to keep the lid closed, and is hung on one of the pivots, L, which support the handle F in a convenient position for being turned.

The handle F is cast in one piece, and with pivots L, which are made to fit in depressions in the square ends of the iron, A, and thus hold it in position to revolve, and with a recess in one of its arms for supporting a spring-catch, G, figs. 1 and 4, pivoted to said arm at I, a projection, J, being made on the inner side of said catch, for locking in notches K, figs. 1 and 2, formed by casting lugs S on the end, B, of the iron, A, and thus hold said iron firmly in the handle. The spring H, which holds the catch G in position, is secured to the handle F at V, fig. 4, it being only necessary to bear against the top end of said catch at P to throw the projection J out of notches K, and thus permit any side of iron A to be set in position for use.

It will be seen from this description that the sad-iron, as constructed and arranged, is peculiarly adapted for millinery purposes, as the iron, A, may have any form of face, whether curved, flat, or angular, to suit the work to be done, and thus make one sad-iron answer the place of several.

Having thus described my invention, I claim—

The revolving sad-iron A, constructed with flat and curved faces, as described, and adjusted in its handle, F, by means of the spring-latch G and the disk S, in which are the notches K, arranged to correspond with the desired position of the sad-iron, substantially as set forth.

JOSEPH SHALKENBACK.

Witnesses:
G. L. CHAPIN,
A. HAYWARD.